(12) United States Patent
Hayashi

(10) Patent No.: US 7,144,442 B2
(45) Date of Patent: Dec. 5, 2006

(54) LIQUID DEGASSING SYSTEM AND LIQUID DEGASSING METHOD

(75) Inventor: Kenji Hayashi, Yoshida-Cho (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 344 days.

(21) Appl. No.: 10/777,197

(22) Filed: Feb. 13, 2004

(65) Prior Publication Data

US 2004/0163541 A1 Aug. 26, 2004

(30) Foreign Application Priority Data

Feb. 20, 2003 (JP) .............................. 2003-042286

(51) Int. Cl.
*B01D 19/00* (2006.01)

(52) U.S. Cl. ............... 95/8; 95/46; 95/241; 95/266; 96/6; 96/156; 96/193; 118/610

(58) Field of Classification Search ............ 96/156, 96/6, 193; 95/46, 241, 8, 266; 118/610
See application file for complete search history.

(56) References Cited

U.S. PATENT DOCUMENTS 2,914,589 A * 11/1959 Mertz .......................... 203/3
4,259,360 A * 3/1981 Venetucci et al. .......... 426/231
6,740,139 B1 * 5/2004 Russell et al. ................ 95/8
2003/0029317 A1 * 2/2003 Russell et al. .............. 95/241

FOREIGN PATENT DOCUMENTS

JP 9-253459 9/1997

OTHER PUBLICATIONS

FLOM Corporation website, www.flom.co.jp, Degasser product information, copyright 2003.*

* cited by examiner

*Primary Examiner*—Duane Smith
*Assistant Examiner*—Douglas J. Theisen
(74) *Attorney, Agent, or Firm*—Young & Thompson

(57) ABSTRACT

A degassing device capable of regulating an amount of air dissolved in a liquid. A device for measuring amounts of dissolved oxygen measures the amount of oxygen dissolved in one of a coating liquid which has yet to be degassed, and is to be fed to a film degassing device, and a coating liquid which has been degassed and discharged from the film degassing device. Based on measured results, a control unit regulates the degree of opening of a vacuum valve so as to change the degree of degassing performed by the film degassing device, thereby suppressing fluctuations in an amount of oxygen dissolved in the coating liquid. A load never constantly acts on the film all the time, the film life can accordingly be extended, thus resulting in reductions in running costs.

17 Claims, 7 Drawing Sheets

FIG. 2

| DEGASSING METHOD | FLUCTUATION IN THE REDUCTION RATE OF THE DISSOLVED OXYGEN AMOUNT (1 HOUR) |
|---|---|
| CONVENTIONAL METHOD<br>A SINGLE FILM DEGASSING DEVICE<br>WITHOUT FEEDBACK MECHANISM | 75%~90%<br>DEGREE OF VACUUM :40×10$^2$Pa (CONSTANT) |
| FIRST EXAMPLE<br>WITH FEEDBACK MECHANISM | 80%~85%<br>DEGREE OF VACUUM :67×10$^2$Pa~106×10$^2$Pa |

FIG. 4

| DEGASSING METHOD | REDUCTION RATE OF DISSOLVED OXYGEN AMOUNT | LIFE |
|---|---|---|
| CONVENTIONAL METHOD CONTINUOUS OPERATION OF THREE FILM DEGASSING DEVICES | 75%~85% DEGREE OF VACUUM :40×10$^2$Pa (CONSTANT) | 2 YEARS/SET 12 YEARS ⇒ 18 SETS |
| SECOND EXAMPLE ALTERNATING OPERATION OF ONE TO THREE FILM DEGASSING DEVICES | 80%~85% DEGREE OF VACUUM :67×10$^2$Pa~106×10$^2$Pa | (1) 2 YEARS/1 SET (2) 3 YEARS/1 SET (3) 4 YEARS/1 SET 12 YEARS ⇒ 13 SETS IN COMPARISON WITH THE CONVENTIONAL METHOD, 5 SETS ARE REDUCED OVER 12 YEARS. |

LIQUID DEGASSING SYSTEM AND LIQUID DEGASSING METHOD

CROSS-REFERENCE TO RELATED APPLICATION

This application claims priority under 35 USC 119 from Japanese Patent Application No. 2003-42286, the disclosure of which is incorporated by reference herein.

BACKGROUND OF THE INVENTION

1. Field of the Invention

The present invention relates to a system and method for degassing air dissolved in a liquid.

2. Description of the Related Art

In the formation of a photosensitive planographic printing plate, a coiled aluminum plate (hereinafter referred to as "web") normally undergoes surface treatments such as graining, anode oxidation, or chemical conversion treatment either independently or in combination, next undergoes a coating process in which a coating liquid is applied, and then progress to a drying process.

In the process in which coating liquid is applied, if the coating liquid containing dissolved air is applied in that state, air bubbles cause the coated surface to have defects such as bubble repellent marks, vertical streaks, or pinholes, and it is not possible to form a uniform photosensitive layer on the web. Therefore, it is necessary to remove the air dissolved in the coating liquid which is to be applied on the web.

As is shown in FIG. 7, a normal method for effectively removing air dissolved in a solution is for a coating liquid L stored in a reserve tank 100 to be fed by a liquid feeding pump 102 to degassing devices 104 which are arranged in rows, for the air dissolved in the liquid to be removed and for the liquid to be further fed in that state to a coating device 108 through a filter 106 (See Japanese Patent Application Laid-open (JP-A) No. 9-253459).

However, the amount of dissolved air in the coating liquid which is stored in the reserve tank 100 fluctuates, depending on changes in the amount of the coating liquid returned to the reserve tank 100 from the coating device 108, on the amount of coating liquid fed from the degassing devices 104 to the coating device 108, on the timings that coating liquid is fed from the stock tank 120 to the reserve tank 100, and on other conditions. For these reasons the amount of dissolved air in a coating liquid that has been degassed also fluctuates, whereby coating failures may be generated in the coating device. To cope with these changes in load, plural degassing devices 104 are arranged so as to minimize fluctuations in the amount of dissolved air.

However, when plural degassing devices are arranged and particularly when film degassing devices are used, the performance of the devices deteriorates as the state of degassing films 105 deteriorates, and it is necessary to replace the degassing films 105 periodically, thereby increasing running costs.

Since different methods of coating are used for different types of products, requirements in respect of the amount of dissolved air also vary from one coating liquid to another. However, conventional degassing devices only degas at constant degree of vacuum by driving a vacuum pump 110. In other words, they are restricted to a fixed set of conditions, and it has not proved possible to regulate flexibly the amount of dissolved air in a coating liquid that has been degassed.

SUMMARY OF THE INVENTION

In view of the aforementioned facts, a present invention provides a degassing device and a method which can regulate the amount of air dissolved in a liquid, the device including a degassing film that has a long life.

A first aspect of the invention is to provide a liquid degassing system comprising: a degassing device for removing air dissolved in a liquid by feeding the liquid thereinto, degassing the liquid, and discharging the liquid therefrom; a detecting device for detecting an amount of air dissolved in at least one of a liquid which is to be fed to the degassing device and a liquid which has been discharged from the degassing device; a degassing regulating unit for regulating an amount of dissolved air degassed by the degassing device; and a control unit for controlling the degassing regulating unit, based on detection results obtained by the detecting device, thereby regulating a degree of degassing performed by the degassing device.

According to the first aspect, the amount of air dissolved in at least one of the liquid which is to be fed to the degassing device and the liquid which has been degassed and discharged from the degassing device is detected by the dissolved air amount detecting device (a device for detecting amounts of dissolved air). Based on results obtained by the dissolved air amount detecting device, the control unit controls the degassing regulating unit so as to regulate the degree of degassing performance by the degassing device, thereby suppressing fluctuations in the amount of dissolved air in the liquid.

Even if, depending on the type of the product, requirements change in respect of the amount of dissolved air, they can always be met, because the degree of degassing performed by the degassing device can be regulated. Further, when the degassing device is a film degassing device, a load never acts constantly on the film, film life can be accordingly extended and running costs can be reduced.

In cases where water is used as the liquid, and the amount of dissolved air in the water is regulated, the amount of dissolved air in the water that has been degassed and discharged from the degassing device can be detected and subjected to a feedback control. On the other hand, in cases where the amount of dissolved air in a solvent is regulated, the amount of saturated gas cannot be measured accurately because the solvent is a mixture solution. In these cases, the amount of dissolved air before and after degassing by the degassing device are detected, and based on the results the amount of degassing is regulated to obtain a desired amount of dissolved air.

In the first aspect, the degassing regulating unit may be a pressure reducing/regulating valve installed in a pipe which connects the degassing device with the vacuum pump, and the control unit may regulate the degree of opening of the pressure reducing/regulating valve.

In the aforementioned structure, the pressure reducing/regulating valve is installed in the pipe which connects the degassing device with the vacuum pump for evacuating the degassing device. The degree of vacuum is changed by regulating the degree of opening of the pressure reducing/regulating valve, thereby controlling the degree of degassing performed by the degassing device. Since in this structure it is unnecessary to control the driving of the vacuum pump, control is simplified.

A second aspect of the invention is to provide a liquid degassing system comprising: a group of degassing devices arranged in rows, each of the group of degassing devices having a liquid providing flow path for providing thereto a liquid which is to be degassed and a liquid discharge flow path for discharging therefrom a liquid which has been degassed; a detecting device for detecting an amount of air dissolved in at least one of the liquid which is to be fed to the group of degassing devices and the liquid which has been discharged from the group of degassing devices; a switching device for switching providing the liquid to at least one degassing device from among the group of degassing devices; and a control unit for operating the switching device based on detection results obtained by the detecting device, thereby providing the liquid to at least one degassing device selected by the switching device.

According to the second aspect of the invention, a group of degassing devices are arranged, parallel or serially, to form a group of degassing devices. Each group of degassing devices is respectively provided with common paths used for the flow of liquid which has still to be degassed and for the flow of liquid which has already been degassed. The amount of dissolved air in at least one of the liquid which has not been degassed and is to be fed to the group of degassing devices, and the liquid which has been degassed and discharged from the group of degassing devices, is detected by the dissolved air amount detecting device.

Based on the detection results obtained by the dissolved air amount detecting device, the control unit feeds the liquid to the degassing device selected by operating the switching device (i.e., changing the number of degassing devices used). The amount of degassing is thus regulated and fluctuations in the amount of dissolved air in the liquid are suppressed.

When a group of degassing devices are operated, the frequency with which the degassing devices are used decreases on average, and in the case of film degassing the life span of films used can be lengthened, thus leading to reductions in running costs.

In the second aspect of the invention, the switching device may be an open-close valve installed in the liquid inflow pipe of each of the group of degassing devices, and the control unit may be designed to operate opening and closing of the open-close valve.

In the aforementioned structure, an open-close valve is installed in the liquid flow pipe of each of the group of degassing devices as the switching device, and opening and closing of the open-close valve is operated by the control unit so as to feed the liquid to the degassing device selected.

A third aspect of the invention is to provide a liquid degassing method for degassing air dissolved in a liquid which is to be coated on a web, the method comprising: preparing a degassing device; feeding a liquid to the degassing device and discharging the liquid therefrom; detecting an amount of air dissolved in at least one of the liquid which is to be fed to the degassing device and the liquid which has been discharged from the degassing device; and regulating a degree of degassing performed by the degassing device, based on detection results.

BRIEF DESCRIPTION OF THE DRAWINGS

FIG. 2 is a table comparing the liquid degassing system of the first embodiment of the invention with a conventional degassing system.

FIG. 4 is a table comparing the liquid degassing system of the second embodiment of the invention with a conventional degassing system.

DETAILED DESCRIPTION OF THE INVENTION

Figure 1:
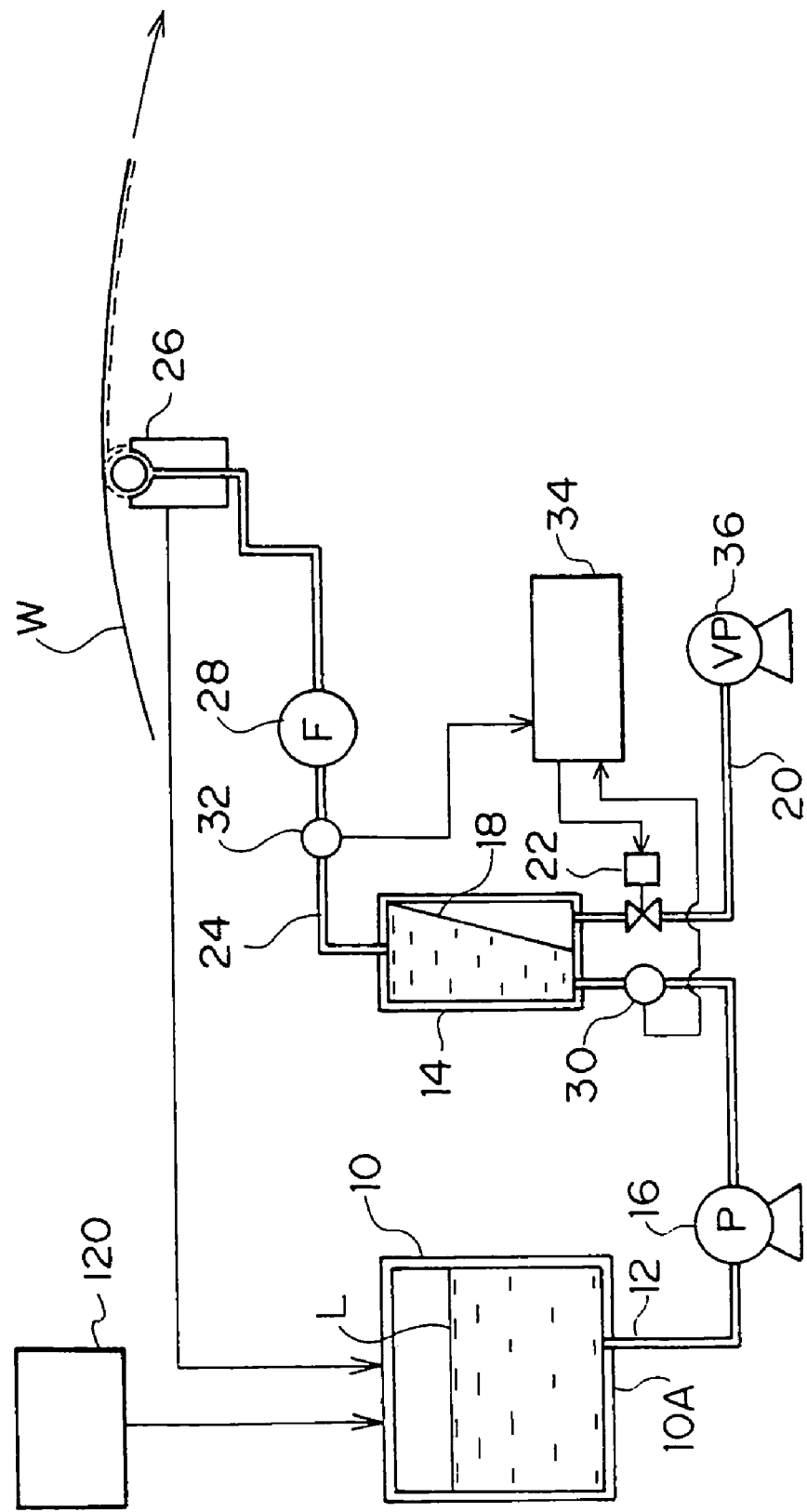
FIG. 1 is a view showing the liquid degassing system of a first embodiment of the present invention.

As shown in FIG. 1, a liquid degassing system of a first embodiment includes a reserve tank 10 which stores as a liquid a coating liquid L (organic solvent-based). A water feeding pipe 12 is connected to a bottom wall 10A of the reserve tank 10. On a downstream side of the water feeding pipe 12, the pipe 12 is connected to a film degassing device 14. Coating liquid stored in the reserve tank 10 is fed by a liquid feeding pump 16 installed in the water feeding pipe 12 to a top side of a degassing film 18. When coating liquid in the reserve tank 10 diminishes, the reserve tank 10 is replenished from a stock tank 120 and liquid returned from a coating device 26 is also added.

The degassing film 18 used is a sheet-like or sack-like thin film (size: 8000×350 mm) made from a tetrafluoroethylene-hexafluoropropylene copolymer. The degassing film 18 can also be a fluororesin film such as a tetrafluoroethylene-hexafluoropropylene copolymer resin film, a tetrafluoroethylene-perfluoroalkoxyethylene copolymer resin film, or a tetrafluoroethylene-ethylene copolymer resin film. The thickness of the fluororesin film is preferably not more than 100 μm and more preferably not more than 50 μm.

A suction pipe 20 is connected to a rear surface side of the degassing film 18. The rear surface side of the degassing film 18 is sucked by a vacuum pump 36 through the suction pipe 20, so that the degree of vacuum is regulated by a vacuum valve 22, which will be described later, within the range of $67\times10^2$ Pa to $106\times10^2$ Pa. The amount of dissolved oxygen in the coating solution L is diminished by the degassing film 18, and the coating solution L is fed through a filtering device 28 installed in a water discharge pipe 24 to the coating device 26. The coating device 26 applies the coating liquid L uniformly onto the web W.

The water feeding pipe 12 is equipped with a dissolved oxygen amount measuring device 30 (a device for measuring amounts of dissolved oxygen), and the water discharge pipe 24 is equipped with a dissolved oxygen amount measuring device 32. The dissolved oxygen amount measuring device 30 measures an amount of oxygen dissolved in the coating liquid which has still to be degassed, and outputs a measured value to a control unit 34. The dissolved oxygen amount measuring device 32 measures an amount of oxygen dissolved in the coating liquid which has already been degassed, and outputs a measured value to the control unit 34.

These dissolved oxygen amount measuring devices are structured, for embodiment, by an oxygen-lead battery having an oxygen electrode made from a gold electrode as the positive electrode and a lead electrode as the negative electrode. The oxygen dissolved and dispersed in the coating liquid is reduced at the positive electrode, causing electric current proportionate to the density of oxygen between the electrodes. This current is detected as the terminal voltage of the thermistor, and the amount of dissolved oxygen is measured on the basis of a change in voltage.

On the other hand, the suction pipe 20 is equipped with the vacuum valve 22. The degree of opening of the vacuum valve 22 is regulated by the control unit 34 so as to regulate the degree of degassing performed by the film degassing device 14.

The coating liquid applied in the invention is not limited to the organic solvent-based liquid, and a water-based coating liquid can also be applied. A water-based coating liquid can effectively suppress the occurrence of micro air bubbles, so a coating liquid having a viscosity of 1 c.p. or higher is preferable, and a coating liquid with a viscosity not less than 5 c.p. is more preferable.

The water-based coating liquid can be formed into either a single layer or a plurality of layers, and also can be applied to a multilayer liquid coating device. The web W (supporting member) is not limited to specific materials, such as aluminum, PET, or the like.

The materials and shape of the housing which structures the film degassing device 14 are not particularly restricted. Furthermore, the degassing film can be either nonporous or porous, and its shape can be either sheet-like or sack-like. The degassing film can also be structured such that a pressure inside a hollow fiber is lowered and the coating liquid flows therearound.

Operation of the liquid degassing system of the first embodiment will be described below.

In this embodiment, a volume of the top surface side of the degassing film 18 in the film degassing device 14 is set to 1.25 liters and a capacity of the coating liquid to be fed to the film degassing device 14 is set to 1.5 liters/min. The present embodiment will be compared with a conventional degassing system in which one film degassing device is continuously operated to degas the coating liquid, without performing a feedback control by measuring the amount of dissolved oxygen.

In this embodiment, the amount of oxygen dissolved in the coating liquid to be fed to the film degassing device 14 is continuously measured by the dissolved oxygen amount measuring device 30, and a measurement value A is outputted to the control unit 34. The control unit 34 calculates the degree of opening of the vacuum valve 22 from a designed amount of oxygen dissolved in the coating liquid which has been inputted in advance as product data, and regulates the degree of vacuum of the vacuum pump 36 within the range of 100 to 70%. In this case, the degree of vacuum is regulated within the range of $67\times10^2$ Pa to $106\times10^2$ Pa.

Next, the dissolved oxygen amount measuring device 32 continuously measures the amount of oxygen dissolved in the coating liquid already discharged from the film degassing device 14, and outputs a measurement value B to the control unit 34. Thus, the amount of oxygen dissolved in the coating liquid is subjected to a feedback control, but, since the coating liquid is a mixture solution, the measurement value B will not always necessarily be accurate.

When the gap (difference) between the measurement value A revealed by the dissolved oxygen amount measuring device 30 and measurement B is greater than a prescribed value, an extra value, determined in advance, is added to the degree of opening of the vacuum valve 22, calculated on the basis of measurement value B so as to control the degree of vacuum, and thus regulate the degree of degassing performed by the degassing device. On the other hand, when the gap (difference) between measurement value A and measurement value B is less than the prescribed value, the degree of vacuum is controlled by the degree of opening of the vacuum valve 22 calculated on the basis of measurement value B, and thus the degree of degassing performed by the degassing device is regulated.

As a result, as shown in the table of FIG. 2, in the conventional degassing system, degassing is constantly performed with the degree of vacuum invariably set at $40\times10^2$ Pa. According to measurements taken over a one-hour period, during which the coating liquid discharged from the degassing device was continuously measured, the reduction rate of the amount of dissolved oxygen varied in the range of 75 to 95%. However, in the present embodiment, the reduction rate of the amount of dissolved oxygen was in the range of 80 to 85%, demonstrating a reduced rate of fluctuation.

Thus, regulation of the degree of degassing performed by the film degassing device 14 can suppress fluctuations in the amount of oxygen dissolved in the coating liquid. Conversely speaking, even if requirements in respect of the amount of dissolved air change depending on the type of the product, the film degassing device 14 can cope with changes of requirements because the degree of degassing performed by the degassing device can be regulated. Moreover, since the load never constantly acts on the degassing film 18 of the film degassing device 14, the life span of the degassing film 18 can be lengthened, thus resulting in reductions in running costs.

The degree of vacuum (the degree of degassing) of the film degassing device 14 of the present embodiment can be regulated within the range of $600\times10^2$ Pa to $13\times10^2$ Pa, and the operating range is preferably $267\times10^2$ Pa or less, and more preferably $40\times10^2$ Pa or less.

Although it is possible to control the driving of the output of the vacuum pump, because in this case the degree of vacuum is hard to stabilize, the degree of opening is better used to control the degree of vacuum. Furthermore, in order to measure the amount of dissolved air, the dissolved oxygen amount measuring device used in the present embodiment can be replaced by a dissolved nitrogen amount measuring device.

As a method for controlling the degree of vacuum, it is also possible to turn the vacuum valve on and off, instead of regulating the degree of opening of the vacuum valve.

The liquid degassing system of a second embodiment will be described below.

Figure 3:
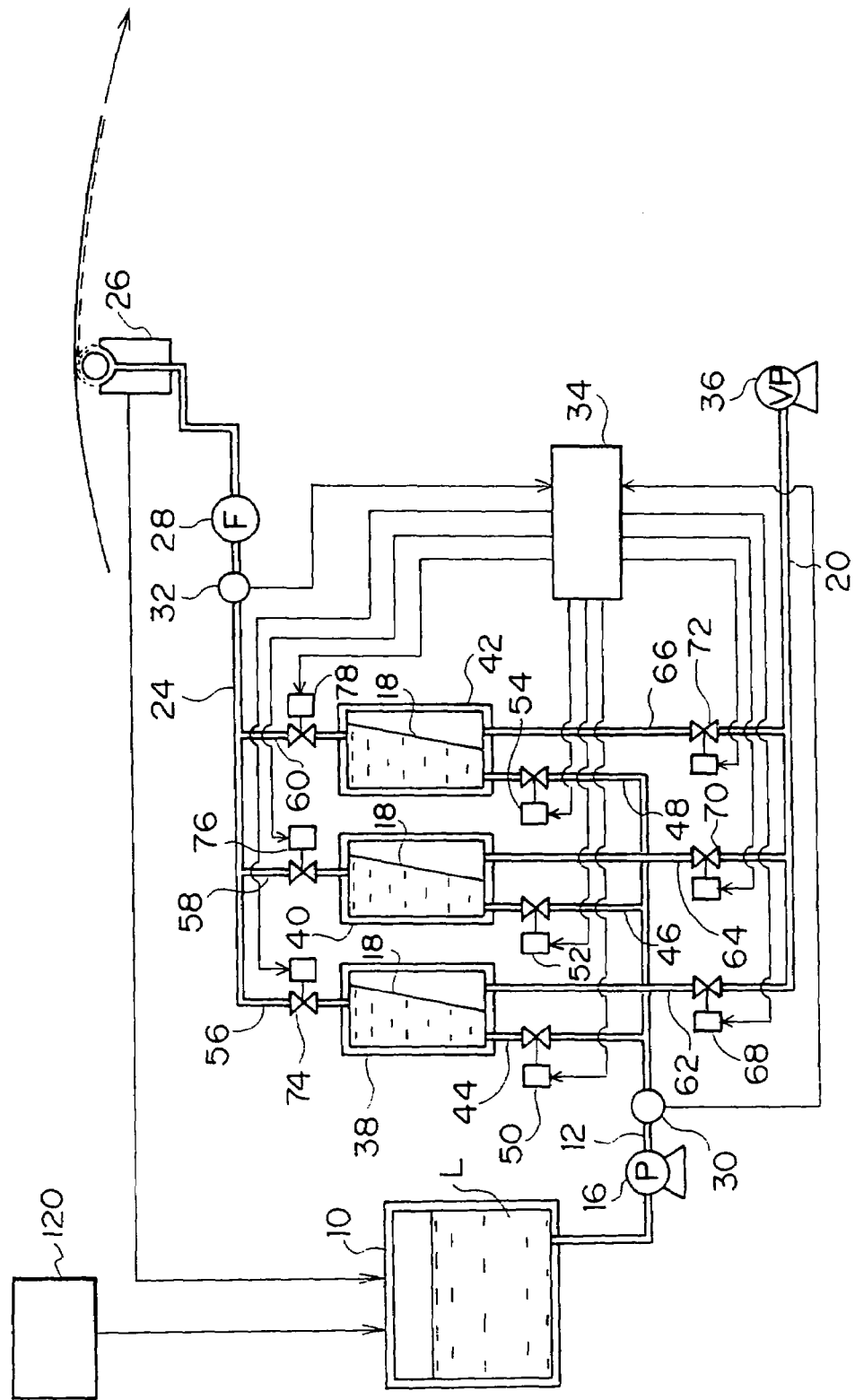
FIG. 3 is a view showing the liquid degassing system of a second embodiment of the invention.

As shown in FIG. 3 in the second embodiment, three film degassing devices 38, 40, and 42 are arranged in parallel.

To be more specific, three branch pipes 44, 46, and 48 which diverge from a common pipe, the water feeding pipe 12, are connected to inlets for liquids of the film degassing devices 38, 40, and 42, respectively. The branch pipes 44, 46, and 48 are equipped with open-close valves 50, 52, and 54, respectively, and the open-close valves 50, 52, and 54 are connected with the control unit 34 so as to be opened and closed by a control signal therefrom.

Water discharge pipes 56, 58, and 60 are connected to discharge outlets of the film degassing devices 38, 40, and 42, respectively. The water discharge pipes 56, 58, and 60 converge into a single water discharge pipe 24 on the discharge side, thereby feeding liquid to the coating device 26 through a filtering device 28.

The water discharge pipes 56, 58, and 60 are equipped with open-close valves 74, 76, and 78, respectively, and the open-close valves 74, 76, and 78 are connected with the control unit 34 so as to be opened and closed in synchronization with the open-close valves 50, 52, and 54 on the side of the branch pipes.

The water feeding pipe 12 and the water discharge pipe 24 are equipped with dissolved oxygen amount measuring devices 30 and 32, respectively, and measuring devices 30 and 32 measure the amount of oxygen dissolved in the coating liquid and output the measurement values to the control unit 34.

Furthermore, suction pipes 62, 64, and 66, which are connected to the suction pipe 20, are connected to the rear surface sides of the respective degassing films 18. The vacuum pump 36 installed in the suction pipe 20 sucks the rear surface sides of the degassing films 18 of the film degassing devices. The suction pipes 62, 64, and 66 are equipped with vacuum valves 68, 70, and 72, respectively. The degrees of opening of the vacuum valves 68, 70, and 72 are regulated by the control unit 34, whereby the degrees of vacuum of the film degassing devices 38, 40, and 42 can be regulated.

The following is a description of the operation of the liquid degassing system of the second embodiment.

In this embodiment, the volume of the front surface side of the degassing film 18 of each of the film degassing devices 38, 40, and 42 is set to 1.25 liters and the capacity of the coating liquid to be fed to the water feeding pipe 12 is set to 4.0 liters/min. This embodiment will be compared with a conventional degassing system in which a coating liquid is degassed by continuously operating three film degassing devices, without measuring the amount of dissolved oxygen and thus performing a feedback control.

In this embodiment, the amount of oxygen dissolved in the coating liquid to be fed to the film degassing devices 38, 40, and 42 is continuously measured by the dissolved oxygen amount measuring devices 30, and a measurement value A is outputted to the control unit 34. The control unit 34 calculates the degrees of opening of the vacuum valves 68, 70, and 72 from the designed amount of oxygen dissolved in the coating liquid, which has been inputted in advance as product data, and regulates the degree of vacuum of the vacuum pump 36 within the range of 100 to 70%. In this case, the degree of vacuum is regulated within the range of $67 \times 10^2$ Pa to $106 \times 10^2$ Pa.

Feedback control by the measurement value B of the dissolved oxygen amount measuring device 32 is performed in the same manner as in the first embodiment.

In this embodiment, the amount of degassing is regulated on the premise that each of the vacuum valves 68, 70, and 72 has the same degree of opening. However, as an alternative, a total of six dissolved oxygen amount measuring devices can respectively be provided to the water discharge pipes 56, 58, 60 and to the branch pipes 44, 46, and 48 so that the degrees of opening of the vacuum valves can respectively be regulated in a manner such that the amount of oxygen dissolved in the coating liquid discharged from the water discharge pipes 56, 58, and 60 is kept constant. Thus, fluctuations in the degree of degassing caused by the wearing-out of the degassing films can be nullified.

On the other hand, when requirements in respect of the amount of dissolved oxygen required for the coating liquid change depending on the type of product, the number of degassing devices operated is changed by closing at least one of the open-close valves of the branch pipes and at least one of the open-close valves of the water discharge pipes, both of which sets of pipes are connected to the degassing devices to be stopped. For example, when the operation of the film degassing device 38 is to be suspended, the vacuum valve 68 is completely closed to remove the load acting on the degassing film 18.

Under such a method of control, as shown in the table of FIG. 4, in the conventional degassing system, three film degassing devices are continuously operated at a degree of vacuum of $40 \times 10^2$ Pa. According to measurements taken over a one-hour period during which the coating liquid discharged from the degassing devices was continuously measured, the reduction rate in the amount of dissolved oxygen varied in the range of 75 to 85%. Assuming that the life of one degassing device is two years, for continuous operation over a period of 12 years, 18 sets of devices are required, i.e., (12 years/2 years)×3 sets.

On the other hand, in the present embodiment, as a result of regulating the degree of vacuum and changing the number of devices operated from one to three, the rate of reduction in the amount of dissolved oxygen became within the range of 80 to 85%, demonstrating a reduction in fluctuation. Because of variations in frequency of use among the three degassing devices, one had a life of two years, the second a life of three years, and the third a life of four years.

As a result, as shown in the table of FIG. 4, the total number of devices required is (12 years/2 years)×1 set+(12 years/3 years)×1 set+(12 years/4 years)×1 set=13 sets. As compared with the conventional system, the number of sets of devices required can be reduced by five sets, from 18 to 13 sets.

As described above, in this embodiment, the frequency of use of the degassing devices on average decreases, and thus the life span of degassing films can be lengthened, resulting in a reduction in running costs.

Figure 5:
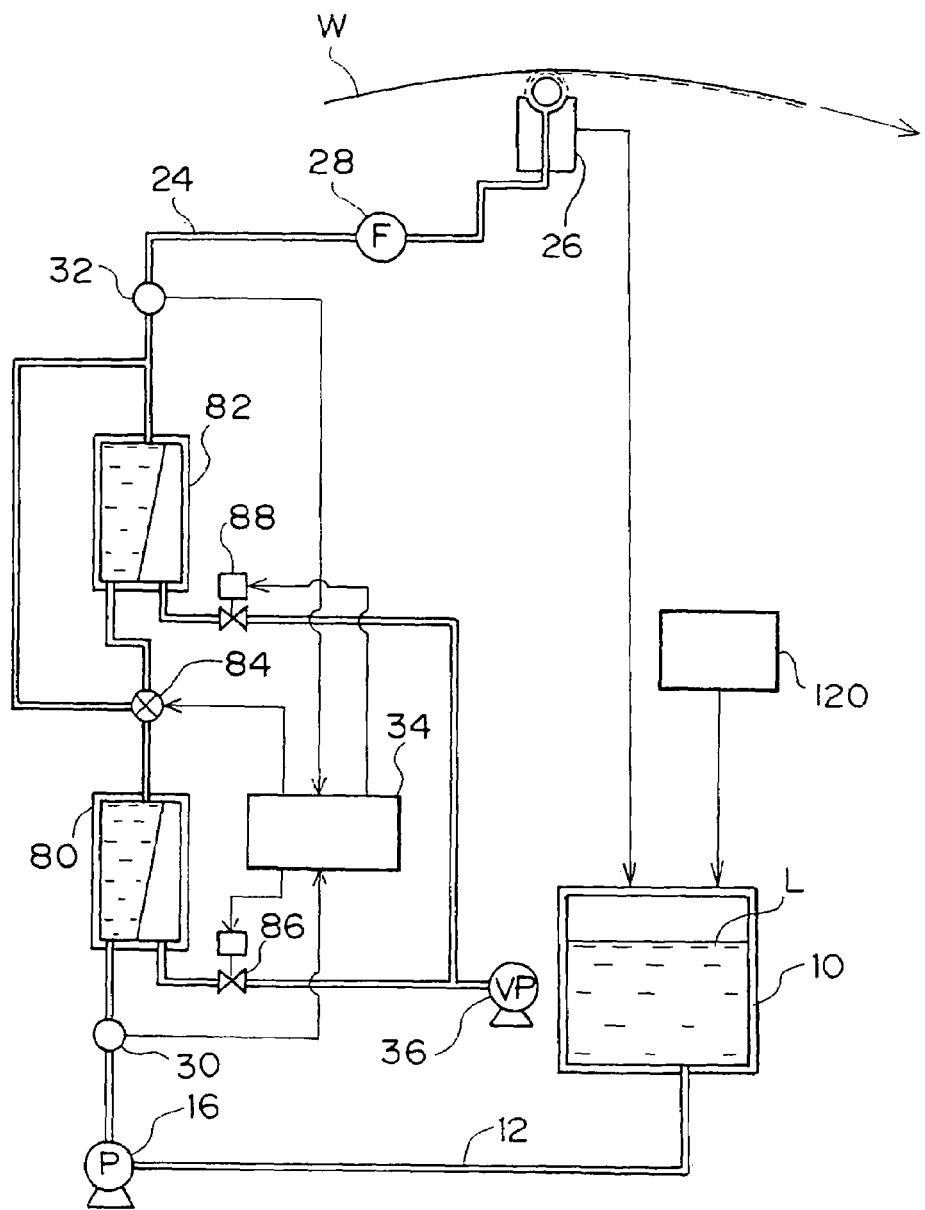
FIG. 5 is a view showing the liquid degassing system of a third embodiment of the invention.

In the second embodiment, a group of degassing devices are arranged in parallel, but, it is possible to arrange film degassing devices 80 and 82 in series as shown in FIG. 5 such that the number of film degassing devices used can be modified so as to change the flow of the coating liquid using a bidirectional valve 84. The regulation of the degrees of opening of vacuum valves 86 and 88 in order to change the degree of degassing can be performed in the same manner as in the second embodiment.

Figure 6:
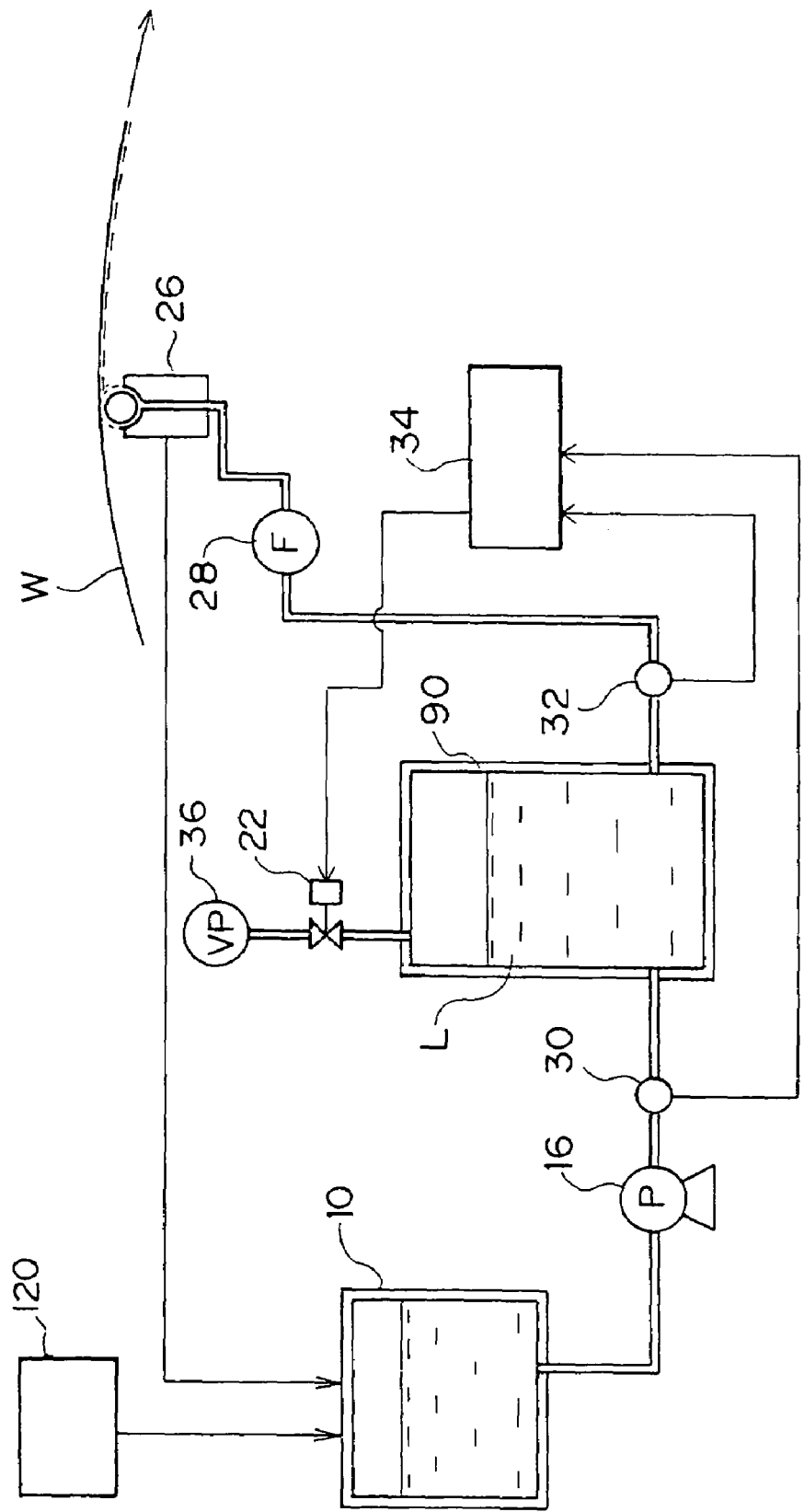
FIG. 6 is a view explaining the liquid degassing system of a fourth embodiment of the invention.
Figure 7:
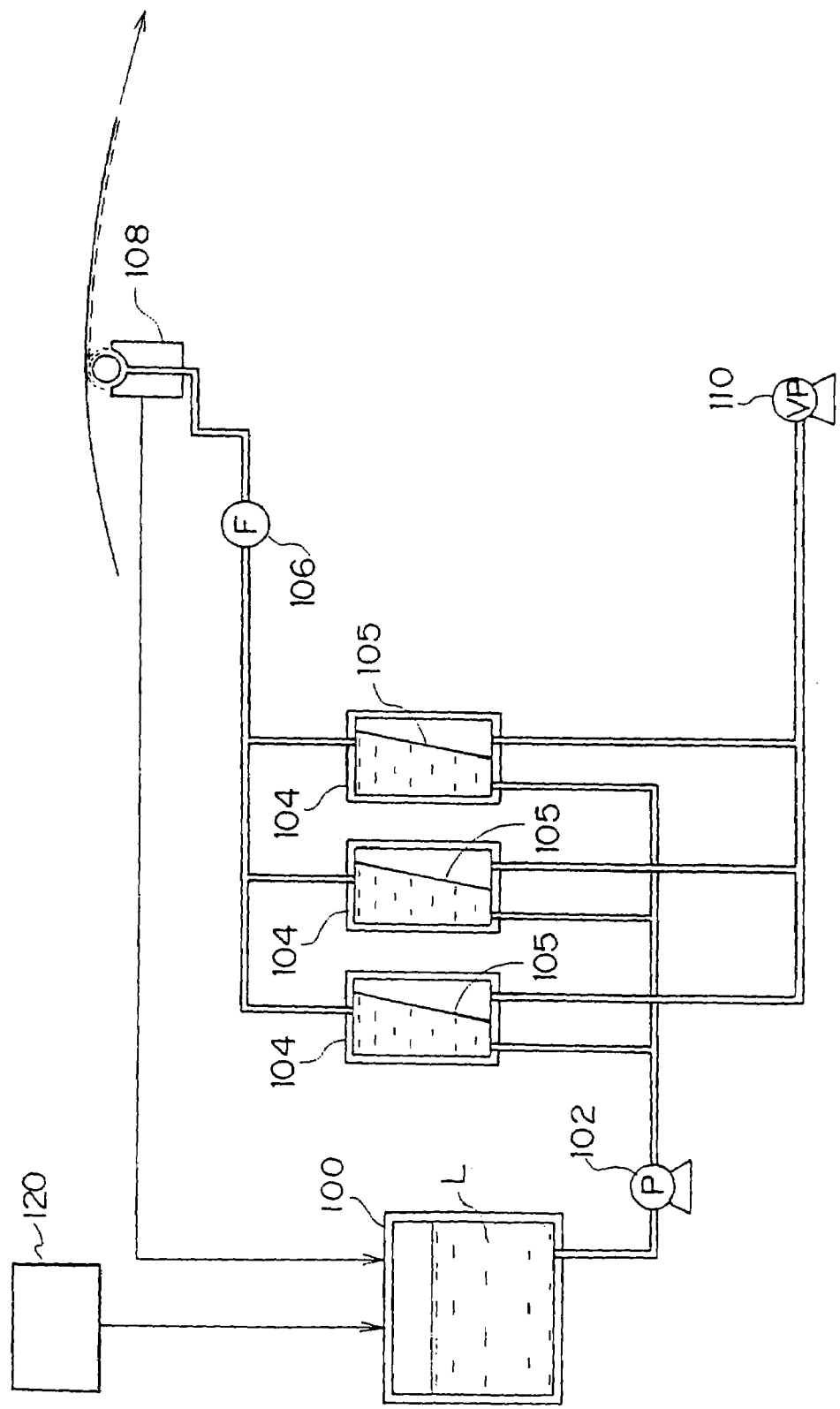
FIG. 7 is a view explaining a conventional degassing system for a coating liquid.

Furthermore, as shown in FIG. 6 it is possible to apply the degassing system of the invention to a system for degassing a coating liquid by reducing the pressure of a degassing tank 90, instead of the film degassing device.

The overall manufacturing process of the web for producing a PS plate will be described briefly below.

The PS plate was produced as follows: A JIS-A1050 aluminum material containing 99.5% by weight of aluminum, 0.01% by weight of copper, 0.03% by weight of titanium, 0.3% by weight of iron, and 0.1% by weight of silicon was formed into a 0.30 mm-thick rolled sheet. The surface of this sheet was grained by using a 20% by weight aqueous suspension of 400 mesh pumice (manufactured by KCM Corporation) and a rotary nylon brush (6, 10-nylon), and was then washed well with water.

The sheet was soaked in 15% by weight of an aqueous solution of sodium hydroxide (containing 4.5% by weight of aluminum), etched to make the amount of dissolved aluminum 5 g/m$^2$, and washed with running water. The sheet was further neutralized with 1% by weight of nitric acid and then subjected to an electrolytic surface roughening process with an amount of anode-time electricity of 160 coulomb/dm$^2$ in 0.7% by weight of an aqueous solution of nitric acid (containing 0.5% by weight of aluminum), using a rectangular alternating waveform voltage having 10.5 volts of anode-time voltage and 9.3 volts of cathode-time voltage (current ratio r=0.90, the current waveform described in the embodiment of Japanese Patent Application Publication (JP-B) No. 58-5796). After being washed with water, the sheet was soaked in 10% by weight of an aqueous solution of sodium hydroxide at 35° C., etched to make the amount of dissolved aluminum 1 g/m$^2$, and washed with water.

Then, the sheet was soaked in 30% by weight of an aqueous solution of sulfuric acid at 50° C., desmutted, and washed with water.

The sheet was further subjected to a porous anode oxidation coating process in 20% by weight of an aqueous solution of sulfuric acid at 35° C. (containing 0.8% by weight of aluminum) with a DC current. To be more specific, electrolysis was conducted at a current density of 13 A/dm$^2$ so as to make the weight of anode oxidized film 2.7 g/m$^2$ by regulating the electrolysis time. In order to produce a negative type photosensitive planographic printing plate using a diazo resin and a binder, the sheet as a support member, after washing with water, was soaked in 3% by weight of an aqueous solution of sodium silicate at 70° C. for 30 seconds, washed with water, and dried.

The reflection density of the aluminum support member thus obtained was 0.30 when measured with a Macbeth RD920 reflection densitometer, and the average roughness Ra of the center line defined by JIS B00601 was 0.58 μm.

The support member was coated with a roll coater with 1.0% by weight of an aqueous solution of a methyl methacrylate/ethyleacrylate/2-acrylamide-2-methylpropanesulfonic acid sodium copolymer (average molecular weight of about 60,000) (mole ratio of 50:30:20) in such a manner that the amount of coating after drying was 0.05 g/m$^2$.

Furthermore, the following photosensitive solution-1 was applied with the use of bar coater used in this embodiment and dried for 45 seconds at 110° C. The amount of coating after drying was 2.0 g/m$^2$.

| Photosensitive solution-1 | |
|---|---|
| Diazo resin-1 | 0.50 g |
| Binder-1 | 5.00 g |
| Stylite HS-2 (by DAIDO KOGYO CO., LTD.) | 0.10 g |
| Victoria pure blue BOH | 0.15 g |
| Tricresyl phosphate | 0.50 g |
| Dipicolinic acid | 0.20 g |
| FC-430 (SUMITOMO 3M Limited, surfactant) | 0.05 g |
| Solvent | |
| 1-methoxy-2-propanol | 25.00 g |
| Methyl lactic | 12.00 g |
| Methanol | 30.00 g |
| Methylethylketone | 30.00 g |
| Water | 3.00 g |

The aforementioned diazo resin-1 was prepared as follows. First, 29.4 g of 4-diazodiphenylamine sulfate (purity: 99.5%) was gradually added at 25° C. to 70 ml of 96% of sulfuric acid, and stirred for 20 minutes. Then, 3.26 g of paraformaldehyde (purity: 92%) was gradually added over a period of around ten minutes, and the resultant mixture was stirred for four hours at 30° C. so as to perform a condensation reaction. The condensation mole ratio between the diazo compound and the formaldehyde was 1:1. This reaction product was poured into two liters of ice water while being stirred, and treated by an iced thick aqueous solution containing 130 g of sodium chloride. The precipitate was collected through suction filtration, and the partly dried solid matter was dissolved in one liter of water, filtered, cooled with ice, and treated with an aqueous solution containing 23 g of potassium hexafluorophosphate dissolved therein. Finally, the precipitate was collected by being filtered and dried to obtain diazo resin-1.

The binder-1 is a water-insoluble, alkali water soluble film-forming polymer of a 2-hydroxyethyl methacrylate/acrylonitrile/methyl methacrylate/methacrylic acid copolymer (weight ratio of 50:20:26:4, average molecular weight of 75,000, and an amount of contained oxygen of 0.4 meq/g).

Stylite HS-2 (manufactured by DAIDO KOGYO CO., LTD.) is a polymer compound which has a lipid sensitization property higher than that of the binder, and is a copolymer containing styrene and maleic acid-mono-4-methyl-2-pentylester in a mole ratio of 50:50. Its average molecular weight was about 100,000. As described below, a resin solution for mat layer formation was sprayed onto the surface of a photosensitive layer as described above, so as to prepare a mat layer.

As the resin solution for mat layer formation, 12% by weight of an aqueous solution of a methyl methacrylate/ethyleacrylate/2-acrylamide-2-methylpropanesulfonic acid (weight ratio of 65:20:15) copolymer containing in part sodium salt was prepared. The conditions were as follows: a rotary atomizing electrostatic coating machine was used; the atomizer head revolved at 25,000 rpm; the amount of resin solution fed in was 4.0 ml/min.; the voltage applied to the atomizer head was −90 kV; the ambient temperature during coating was 25° C.; and the relative humidity was 50%. A vaporized coating liquid was sprayed on the coat surface for 2.5 seconds. Then, three seconds after the damping, hot air at a temperature of 60° C. and a humidity of 10% was blown for five seconds to dry the surface. The mats had an average height of about 6 μm, an average size of about 30 μm, and the amount of coating was 150 mg/m$^2$.

The invention with the aforementioned structure realizes a degassing device which can regulate the amount of dissolved air in a liquid and which has a long-life degassing film.

What is claimed is:

1. A liquid degassing system comprising:
    a degassing device for removing air dissolved in a liquid by feeding the liquid thereinto, degassing the liquid, and discharging the liquid therefrom;
    a detecting device for detecting an amount of air dissolved in at least one of a liquid which is to be fed to the degassing device and a liquid which has been discharged from the degassing device;
    a degassing regulating unit for regulating an amount of dissolved air degassed by the degassing device; and
    a control unit for controlling the degassing regulating unit, based on detection results obtained by the detecting device, thereby regulating a degree of degassing performed by the degassing device, wherein the degassing device is equipped with a pipe for connecting the degassing device with a vacuum pump, and the degassing regulating unit is a pressure reducing/regulating valve installed in the pipe.

2. The liquid degassing system according to claim 1, wherein the control unit is configured to control a degree of opening of the pressure reducing/regulating valve.

3. The liquid degassing system according to claim 1, wherein the detecting device is configured to detect the amount of air dissolved in both the liquid which is to be fed to the degassing device and the liquid which has been discharged from the degassing device.

4. The liquid degassing system according to claim 1, wherein the liquid is a water-based coating liquid, and the detecting device is configured to detect the amount of air dissolved in the liquid which has been discharged from the degassing device.

5. The liquid degassing system according to claim 1, wherein
    the degassing device is equipped with a degassing film.

6. The liquid degassing system according to claim 1, wherein the liquid is a coating liquid to be applied on a web of a photosensitive planographic printing precursor.

7. A liquid degassing system comprising:
a group of degassing devices arranged in rows, each of the group of degassing devices having a liquid providing flow path for providing thereto a liquid which is to be degassed and a liquid discharge flow path for discharging therefrom a liquid which has been degassed;
a detecting device for detecting an amount of air dissolved in at least one of the liquid which is to be fed to the group of degassing devices and the liquid which has been discharged from the group of degassing devices;
a switching device for providing the liquid to at least one degassing device from among the group of degassing devices; and
a control unit for operating the switching device based on detection results obtained by the detecting device, thereby providing the liquid to at least one degassing device selected by the switching device.

8. The liquid degassing system according to claim 7, wherein the switching device is equipped with open-close valves for the respective liquid providing flow paths, and the control unit is equipped to open and close the open-close valves.

9. The liquid degassing system according to claim 7, wherein the group of degassing devices shares a common liquid providing flow path and a common liquid discharge flow path, the respective liquid providing flow paths of the group of degassing devices diverge from the common liquid providing flow path, and the respective liquid discharge flow paths of the group of degassing devices converge into the common liquid discharge flow path.

10. The liquid degassing system according to claim 7, wherein each of the group of degassing devices is equipped with a pipe for connecting each of the degassing devices with a vacuum pump, and the switching device is an open-close valve installed in the pipe.

11. The liquid degassing system according to claim 7, wherein
each of the group of degassing devices is equipped with a pipe for connecting each of the group of degassing devices with a vacuum pump, the switching device is an open-close valve installed in the pipe, and the control unit is equipped to open and close the open-close valve.

12. The liquid degassing system according to claim 7, wherein
the detecting device is configured to detect the amount of air dissolved in both the liquid which is to be fed to the group of degassing devices and the liquid which has been discharged from the group of degassing devices.

13. The liquid degassing system according to claim 7, wherein
the liquid is a water-based coating liquid, and the detecting device is configured to detect the amount of air dissolved in the liquid which has been discharged from the group of degassing devices.

14. The liquid degassing system according to claim 7, wherein at least one of the group of degassing devices has a degassing film.

15. The liquid degassing system according to claim 7, wherein
the liquid is a coating liquid to be applied on a photosensitive planographic printing precursor.

16. The liquid degassing system according to claim 7, wherein
at least two of the group of degassing devices are arranged in series so that the liquid discharge flow path of one of the at least two degassing devices can be connected with the liquid providing flow path of another of the at least two degassing devices, the switching device is equipped with a branch path which bypasses one of the at least two degassing devices, and the branch path and the liquid providing flow path of one of the at least two degassing devices are disposed in such a way that one of the two paths can be selected.

17. A liquid degassing method for degassing air dissolved in a liquid which is to be coated on a web, the method comprising:
preparing a degassing device;
feeding a liquid to the degassing device and discharging the liquid therefrom;
detecting an amount of air dissolved in at least one of the liquid which is to be fed to the degassing device and the liquid which has been discharged from the degassing device;
regulating a degree of degassing performed by the degassing device, based on detection results;
detecting an amount of air dissolved in both the liquid which is to be fed to the degassing device and the liquid which has been discharged from the degassing device; and
detecting an amount of air dissolved in the liquid which has been discharged from the degassing device, the liquid being a water-based coating liquid.

* * * * *